United States Patent
Mathur

(10) Patent No.: US 11,182,144 B2
(45) Date of Patent: Nov. 23, 2021

(54) PREVENTING DATABASE PACKAGE UPDATES TO FAIL CUSTOMER REQUESTS AND CAUSE DATA CORRUPTIONS

(71) Applicant: salesforce.com, inc., San Francisco, CA (US)

(72) Inventor: Rohitashva Mathur, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 107 days.

(21) Appl. No.: 16/236,915

(22) Filed: Dec. 31, 2018

(65) Prior Publication Data
US 2020/0210164 A1   Jul. 2, 2020

(51) Int. Cl.
*G06F 9/44*     (2018.01)
*G06F 8/65*     (2018.01)
*G06F 16/28*    (2019.01)
*G06F 16/21*    (2019.01)

(52) U.S. Cl.
CPC ............. *G06F 8/65* (2013.01); *G06F 16/21* (2019.01); *G06F 16/283* (2019.01)

(58) Field of Classification Search
CPC ........... G06F 8/65; G06F 16/21; G06F 16/283
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,987,432 A * | 11/1999 | Zusman ................. G06Q 40/00 705/35 |
| 6,073,163 A * | 6/2000 | Clark ...................... G06F 9/451 709/203 |
| 6,092,083 A | 7/2000 | Brodersen et al. |

(Continued)

OTHER PUBLICATIONS

Title: Managing update conflicts in Bayou, a weakly connected replicated storage author: DB Terry et al , Published on 1995.*

(Continued)

*Primary Examiner* — Chameli Das
(74) *Attorney, Agent, or Firm* — LKGlobal | Lorenz & Kopf, LLP

(57) ABSTRACT

A method for processing database package connections and updates has been developed. First, an execution request for a database package is received. A connection context is then established which can execute the execution request. The database package is determined whether or not it is valid with proper package updates prior to establishing the connection. If the database package is determined to not be valid, change packages are retrieved for the database package. The valid change packages are then compiled for the database package and the connection request is executed for the updated database package with the connection context.

15 Claims, 5 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,212,557 B1* | 4/2001 | Oran | G06F 9/465 709/220 |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,697,948 B1* | 2/2004 | Rabin | G06F 21/10 705/52 |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,707,641 B2* | 4/2010 | Schmeidler | H04L 63/065 726/26 |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0147777 A1* | 10/2002 | Hackbarth | H04M 3/42374 709/205 |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0004865 A1* | 1/2005 | Chudnovsky | G06Q 10/107 705/39 |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2008/0295092 A1* | 11/2008 | Tan | G06Q 30/04 717/178 |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2009/0300179 A1* | 12/2009 | Srinivasan | H04N 21/26291 709/225 |
| 2010/0235433 A1* | 9/2010 | Ansari | H04L 63/20 709/203 |
| 2011/0247051 A1 | 10/2011 | Bulumulla et al. | |
| 2012/0042218 A1 | 2/2012 | Cinarkaya et al. | |
| 2012/0218958 A1 | 9/2012 | Rangaiah | |
| 2012/0233137 A1 | 9/2012 | Jakobson et al. | |
| 2013/0066837 A1* | 3/2013 | Colrain | G06F 16/2365 707/674 |
| 2013/0212497 A1 | 8/2013 | Zelenko et al. | |
| 2013/0218948 A1 | 8/2013 | Jakobson | |
| 2013/0218949 A1 | 8/2013 | Jakobson | |

(56) References Cited

U.S. PATENT DOCUMENTS

| | | |
|---|---|---|
| 2013/0218966 A1 | 8/2013 | Jakobson |
| 2013/0247216 A1 | 9/2013 | Cinarkaya et al. |
| 2014/0250154 A1* | 9/2014 | Asher .................. G06F 16/29 707/812 |
| 2018/0181610 A1* | 6/2018 | Lingamneni ........ G06F 16/2365 |
| 2019/0075183 A1* | 3/2019 | Silberkasten ....... H04L 67/1004 |
| 2020/0192887 A1* | 6/2020 | Peng .................. G06F 16/2365 |

OTHER PUBLICATIONS

Properties and update semantics of consistent views author: G Gottlob, et al, source: ACM, published on 1988.*

Dynamic test input generation for database applications, author: M Emmi et al, published on 2007, Source: ACM org.*

Lore: A database management system for semistructured data; author: J McHugh et al, published 1997.*

Title:: Compiler and runtime support for efficient software transactional memory; author A R: Adl-Tabatabai; published on 2006.*

Title: EnclaveDB: A secure database using SGX , author: C Priebe, published on 2018.*

* cited by examiner

PREVENTING DATABASE PACKAGE UPDATES TO FAIL CUSTOMER REQUESTS AND CAUSE DATA CORRUPTIONS

TECHNICAL FIELD

Embodiments of the subject matter described herein relate generally to database management. More particularly, embodiments of the subject matter relate to preventing database package updates from causing failed requests, data corruptions and incorrect results being returned to the customer.

BACKGROUND

Computer databases require regular maintenance like upgrading to newer versions of software. These updates accomplish various tasks such as addressing bugs, security issues, etc. When the software is updated in certain databases a connection or "database session" that has only accessed the earlier version of the software and sees the new version for the first time will receive an error that may cause failed requests, data corruptions, or incorrect results being returned to the request issuer such as a user, application program interface (API) or a program. In some cases, it is not possible to catch and retry the connection request because the error might follow an autonomous transaction which may cause data corruption. Accordingly, it is desirable to prevent database package updates from failing customer requests, causing data corruptions, or returning incorrect results to the request issuer. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
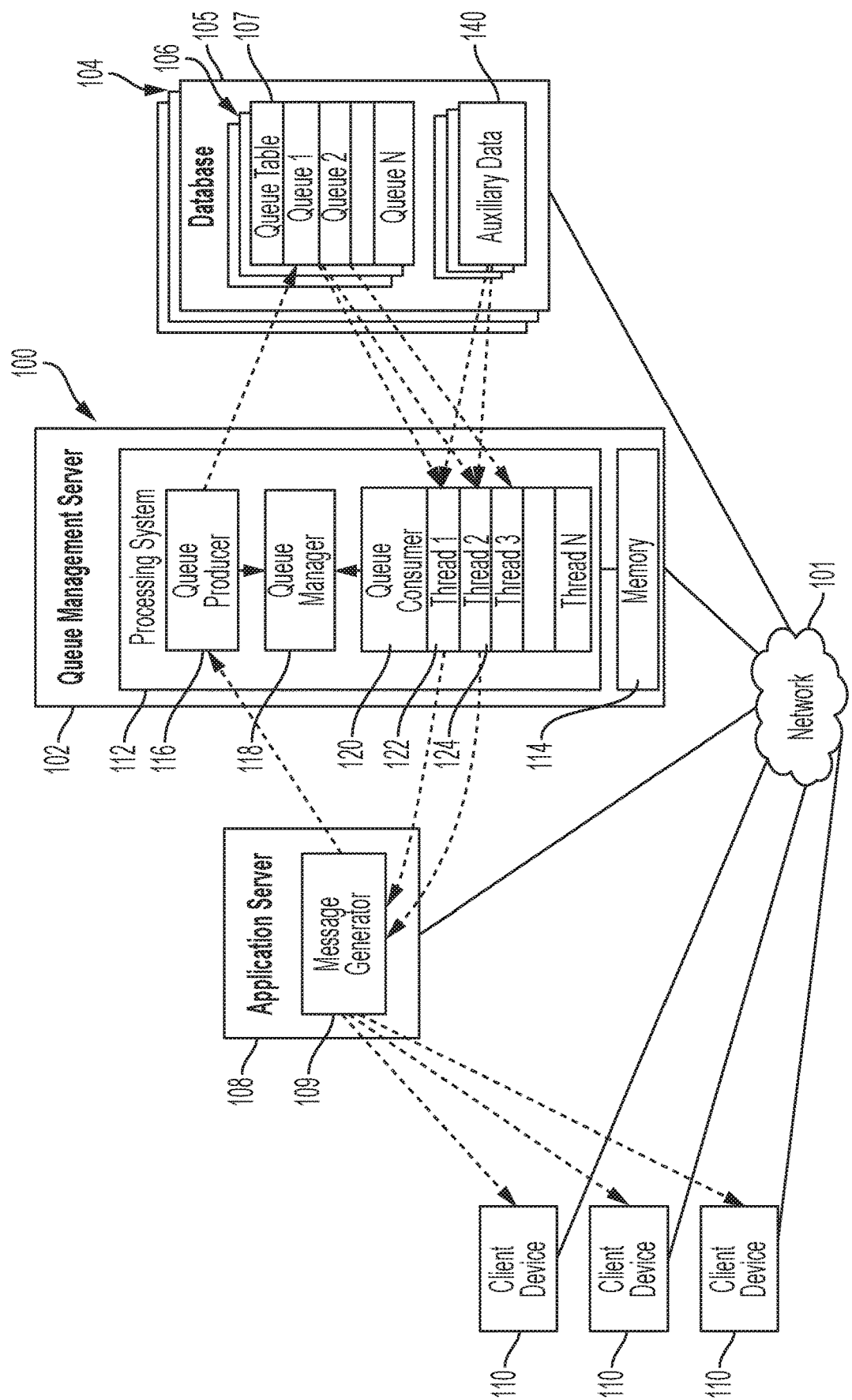
FIG. 1 is a block diagram of an exemplary database system in accordance with one or more embodiments.

A method and system for preventing database package updates to fail requests, cause data corruptions or return incorrect results has been developed. The requests for database access may be from a customer, user, an application program interface (API) or a program. The request will result in a connection being established that is either created or separately obtained from a connection pool. A connection context is established which can execute the connection request. Prior to establishing the connection, a database package or "package" is checked to determine its "validity". Validity is based on the database package having the proper package updates. Validity is checked by determining when the last update occurred to the database package. Updates contain a timestamp that identifies the version of the update and when it took place. Additionally, if the timestamp of the update for the database package is greater (i.e., older) than the start of the connection session, the database package may be determined to not be valid. If the database package is determined to be not valid, the change packages for the database are retrieved and compiled for the database package. The connection request is executed for the updated database package with a connection context after compiling the valid change packages.

In exemplary embodiments, a database that is utilized to support queue handling or processing includes a number of queue tables that correspond to a number of different queue types supported by that respective database, along with one or more auxiliary data tables that include data referenced by or otherwise pertaining to one or more queues maintained in the queue tables. Each queue table is associated with a different queue type, and each queue table has different schema associated therewith. Thus, while the queue tables may share a number of common fields or columns, each queue table has structural differences relative to the other queue tables maintained by the respective database, such as, for example, one or more unique fields or columns, one or more fields or columns that reference different or unique tables of the database, or the like. The queue type also dictates whether or not the queue can be segmented, with one or more fields or columns of a respective queue table being utilized to support segmenting the queue and ordering that queue's entries. As described in greater detail below, a segmented queue may have its own set of dedicated threads so that accumulated entries for one segment do not delay or prevent processing entries of another segment. Each queue type may also correspond to a different type of database transaction, and the queue table schema may be chosen or otherwise designed for that particular type of database transaction. Thus, by allocating different queue types to different database tables, processing entries of a respective queue can be tailored for that particular type of database transaction using work detail data or other configuration information associated with that queue's entries in conjunction with the auxiliary data tables maintained by the database. Additionally, as described in greater detail below, some embodiments include multiple different databases with different database types associated therewith, thereby allowing the processing entries of a respective queue to be improved by ensuring the auxiliary data utilized by a queue maintained in the queue tables of a respective database will more than likely already be maintained in auxiliary data tables of that particular database.

The queue management system identifies a queue of entries in one of the queue tables and determines when to begin processing the queue and the number of processing threads to be allocated to that queue based at least in part on configuration information associated with the queue. Thus, queues can be prioritized and scheduled relative to one another, and entries of a particular queue can be processed in parallel according to the number of allocated threads. As described below, each thread corresponds to a set of programming instructions that are dynamically created at runtime based on the queue configuration information, which are subsequently loaded or fetched and then executed by a processing system of a server. For purposes of explanation, the subject matter is described herein in the context of threads of an individual queue management server being allocated to a particular queue. However, in practice, processing of a particular queue may be distributed across a plurality of servers, where each of those servers has one or more threads allocated to the queue.

As described in greater detail below, each allocated processing thread on a server retrieves a particular number of entries of the queue from the database, and for each of those entries, retrieves corresponding data from an auxiliary data table in the database in a manner that is influenced by the queue type (e.g., based on the configuration data associated with those entries). For example, for entries associated with a first queue, the queue management server may automatically determine a number of threads to be allocated to the first queue based on the total number of entries and a priority criterion associated with the first queue, and then automatically allocate and initiate those threads to processing entries of the first queue. Each thread causes a processing system of the queue management server to retrieve work detail data for a respective subset of entries of the first queue from its associated queue table using the table schema associated with that queue table to identify the appropriate fields of work detail data for the particular database transaction or task type associated with first queue. Each thread then causes the processing system to perform the particular database or task associated with the first queue using those fields of work detail data for that subset of entries. In one or more embodiments, performance of the particular database or task on or using the work detail data generates result data, which, in turn, is transmitted or otherwise provided to another computing device on a network associated with the first queue (e.g., the originating device for the first queue and/or its entries).

FIG. 1 depicts an exemplary embodiment of an on-demand database system 100 that includes a server 102 that manages creation and execution of queues maintained in databases 104 coupled thereto. Accordingly, the queue management server 102 may alternatively be referred to herein as a queue management server. Exemplary embodiments of the on-demand system 100 include a plurality of different types of databases 104, with entries associated with a particular queue being stored or otherwise maintained a particular database of the type that is likely to be most efficient for that particular queue. Additionally, in exemplary embodiments, each database 104 includes a plurality of queue tables 106 corresponding to different queue types, with entries associated with a particular queue being stored or otherwise maintained in the particular queue table 106 corresponding to the queue type that is likely to be most efficient for that particular queue.

In the illustrated embodiment, the queue management server 102 receives or otherwise obtains configuration information defining a particular queue for execution from another computing device, such as an application server 108, which is coupled to the queue management server 102 via a communications network 101, such as a wired and/or wireless computer network, the Internet, a cellular network, a mobile broadband network, a radio network, or the like. The illustrated application server 108 includes or otherwise implements an application platform that generates a message generation application 109 (or message generator) that provides queue information (e.g., queue configuration information and work detail data for queue entries) to the queue management server 102 over the network 101 and receives, from the queue management server 102 via the network 101, result data that is retrieved from a database 104 or otherwise generated in response to the queue management server 102 processing entries of the queue. The queue result data may be utilized by the message generator 109 to generate or otherwise provide a message, notification, or other indication that is provided, via the network 101, to one or more client electronic devices 110 (e.g., any sort of personal computer, mobile telephone, tablet or other network-enabled electronic device that includes user input/output devices). For example, the queue information may include information identifying intended recipients for a message (e.g., an e-mail, a text message, or the like), with the result data from the queue management server 102 including data or information associated with each of the intended recipients, which, in turn, is utilized by the message generator 109 to personalize the message for each particular recipient before pushing or otherwise sending the personalized messages to the intended recipients via the network 101.

As described in greater detail below, in exemplary embodiments, a user of a client device 110 may manipulate a client application executing thereon (e.g., a web browser or the like) to access the application server 108, which, in turn, generates an instance of a virtual application provided to the client device 110 at run-time (or "on-demand") based in part upon code, data, and/or other information stored or otherwise maintained by the queue management server 102 and/or a database 104 (e.g., information identifying available database types, supported queue types, and the like). The virtual application provides a graphical user interface (GUI) which allows the user of the client device 110 to interact with the message generator 109 to create or otherwise define configuration information for a queue to be executed, implemented, or otherwise supported by the queue management server 102. For example, the user may select or otherwise indicate a particular database (or database type) of the plurality of databases 104 (or database types) that the user would like to store or otherwise maintain the queue, the particular queue table (or queue type) of the plurality of queue tables 106 (or queue types) that the user would like to store or otherwise maintain the queue entries (i.e., the queue type the user would like to assign the queue), a level of priority (or priority criterion) the user would like to assign to the queue, and other configuration information or metadata defining the queue to be created. The queue configuration information may be utilized to configure the message generator 109 for automatically generating or creating queue entries for the queue, which are provided to the queue management server 102 for management and execution in accordance with the queue configuration information, as described in greater detail below.

Still referring to FIG. 1, the queue management server 102 generally represents a computing system or another combination of processing logic, circuitry, hardware, and/or other components configured to support the processes, tasks, operations, and/or functions described herein. In this regard, the queue management server 102 includes a processing system 112, which may be implemented using any suitable processing system and/or device, such as, for example, one or more processors, central processing units (CPUs), controllers, microprocessors, microcontrollers, processing cores and/or other hardware computing resources configured to support the operation of the processing system 112 described herein. The processing system 112 may include or otherwise access a data storage element 114 (or memory) capable of storing programming instructions for execution by the processing system 112, that, when read and executed, cause processing system 112 to create, generate, or otherwise facilitate one or more applications 116, 118, 120 configured to manage queues in the databases 104. Depending on the embodiment, the memory 114 may be realized as a random access memory (RAM), read only memory (ROM), flash memory, magnetic or optical mass storage, or any other suitable non-transitory short or long term data storage or other computer-readable media, and/or any suitable combination thereof.

In the illustrated embodiment, a queue producer application 116 executing on the processing system 112 receives, from the message generator 109, queue configuration information and utilizes the queue configuration information to create or otherwise instantiate a queue having the indicated queue type in the desired database of the plurality of databases 104, as described in greater detail below. In this regard, the queue producer 116 manages the writing or storing of entries associated with a particular queue to the queue table 107 corresponding to the selected queue type for the queue within the selected database 105 for the queue. Additionally, in some embodiments, the queue producer 116 may also store or otherwise receive auxiliary data or information for a particular queue to one or more auxiliary database tables 140 in the selected database 105. After creating a queue, the queue producer 116 notifies a queue management application 118 (or queue manager), which, in turn, monitors or otherwise tracks the active queues within the on-demand system 100 and interacts with a queue consumer application 120 to manage the allocation of computing resources of the processing system 112 to a particular queue, as described in greater detail below. In this regard, the queue manager 118 and the queue consumer 120 are cooperatively configured to prioritize and segment processing of queues in a manner that achieves a desired allocation of computing resources.

In practice, portions of the queue creation process may be performed by different elements of the on-demand database system 100, such as, for example, the queue management server 102, the database 104, the processing system 112, the queue producer 116, and/or the queue manager 118. It should be appreciated that the queue creation process may include any number of additional or alternative tasks, the tasks need not be performed in the illustrated order and/or the tasks may be performed concurrently, and/or the queue creation process may be incorporated into a more comprehensive procedure or process having additional functionality not described in detail herein. Moreover, one or more of the tasks shown and described could be omitted from a practical embodiment of the queue creation process as long as the intended overall functionality remains intact.

In exemplary embodiments, the queue creation process begins by identifying or otherwise receiving indication of a desired database type of a plurality available database types for the new queue to be created. In this regard, the entries associated with the queue are stored or otherwise maintained in the particular database 105 where execution of the queue task on those entries is likely to be most efficient. The selected database 105 may be identified using metadata associated with each entry of the queue received by the queue management server 102 over the network 101, which, in turn, is referenced or otherwise utilized by the queue producer 116 to store the entries in the appropriate database 105.

Referring to FIG. 1, the illustrated system 100 includes a plurality of different databases 104 having a different database type associated therewith, such as, a client database, a system database, a statistics database, a transient database, a miscellaneous database, or the like. For example, a client database may store contact database objects or other data or information pertaining to clients, business contacts or the like associated with the various tenants or uses supported by the on-demand system 100. A system database may store data that maps accounts to their respective host client databases within the on-demand system 100 along with system level settings and data (e.g., definitions of application server farms and the like). A statistics database may contain detail and aggregate event level data pertaining to messages (e.g., sent messages, opened messages, acted upon messages, hyperlinks clicked within messages, or the like), which, in turn, may be utilized for reports, extracts, audience segmentation, and the like. It should be appreciated that the foregoing are merely provided as non-limiting examples of database types, and numerous other database types may be present in a given implementation of the on-demand system 100 (e.g., a transient data database, a message database, a link database, an application programming interface (API) database, an error log database, an authorization database, and/or the like).

Based on the type of task being queued, the creator of the queue selects or otherwise identifies the database type that is most appropriate for the task. For example, if the queued task involves retrieving destination address or other contact information for sending a message to a number of clients or subscriber, the contacts database 105 may be selected from among the plurality of databases 104 as the database that is most likely to include the relevant information for the task. Similarly, if queued task involves queued task involves consuming API request, the API database 105 may be selected from among the plurality of databases 104 as the destination database for the queue entries, if the queued task involves delivering rendered messages, the message database 105 may be selected from among the plurality of databases 104 as the destination database for those queue entries, and so on.

As described in greater detail below, in one or more exemplary embodiments, one or more of the databases 104 is realized as multi-tenant database that is shared between multiple tenants. In such embodiments, each tenant has its own set of associated users and its own associated data that is logically separate or otherwise isolated from data belonging to other tenants. In this regard, each of the databases 104 stores or otherwise maintains data associated with a number of different tenants and restricts each tenant's access to other tenants' data (or alternatively, restricts accessibility of each tenant's data with respect to other tenants). Thus, in exemplary embodiments, one or more unique tenant identifiers are associated with each entry of the queue to ensure the queued task is only executed on data associated with (or accessible to) the tenant who created the queue.

The queue creation process also identifies or otherwise receives indication of a desired queue type of a plurality available queue types for the new queue to be created. In this regard, the entries associated with the queue are stored or otherwise maintained in a particular queue table 107 of a plurality of potential queue tables 106 maintained by the selected database 105 that corresponds to the particular type of task associated with the queue being created. For example, each of the queue tables 106 may be associated with a particular type of task, with the columns of the queue table 106 corresponding to the fields of metadata necessary for performing that task. In other words, the number of columns supported by a particular queue table 106 may be dictated or otherwise optimized according to the particular task associated with that queue table 106, thereby improving the efficiency of performing the that task. For example, a first queue table 106 may be associated with a first task type (e.g., an import operation to import data to the selected database 105), a second queue table 106 may be associated with a second task type (e.g., an export operation to export data from the selected database 105), a third queue table 106 may be associated with a third task type (e.g., e-mail send), a fourth queue table 106 may be associated with a fourth task type (e.g., text message send), and the like. Each queue table 106 is also structured in accordance with table schema that is unique to the particular task type associated therewith. In exemplary embodiments described herein, each queue table 106 includes a column or field corresponding to a priority associated with the particular queue, thereby allowing processing of entries of one queue to be prioritized relative to those of another queue based on the relative priorities, as described in greater detail below. Additionally, each queue table 106 includes a column or field corresponding to a unique identifier associated with the particular queue, thereby allowing entries associated with the queue to be identified or otherwise distinguished relative to other entries in the selected queue table 107.

The queue creation process also identifies or otherwise receives queue processing configuration information for the new queue to be created. In exemplary embodiments, the queue processing configuration information includes a priority level to be assigned to the queue along with thread allocation information for allocating available threads of the processing system 112 to performing the tasks associated with the queue. In this regard, the thread allocation information influences the amount of computing resources that are allocated to processing entries associated with the queue, while the priority information influences the temporal performance of those threads. For example, a high priority queue may have threads allocated to it substantially immediately upon creation (e.g., on the order of seconds) so that queue entries are processed by those allocated threads with minimal delay. A normal priority queue may have threads allocated to it with some delay after creation (e.g., on the order of a few minutes), which allows resources to be preserved for higher priority queues or active queues during that interval of time (e.g., 1-2 minutes) between queue creation and thread allocation. Conversely, a low priority queue may have threads allocated to it in an even more delayed manner, so that the interval of time between queue creation and thread allocation is even greater.

The thread allocation information may include or otherwise delineate a requested number of threads to be allocated to the queue, a maximum allowable number of threads that can be allocated to the queue, a minimum allowable number of threads that can be allocated to the queue, and the like. In one or more embodiments, the thread allocation information also includes a timeout period for releasing threads allocated to the queue. Alternatively, or in the absence of the thread allocation information specifying the timeout period, the timeout period may be determined based on the priority associated with the queue, and in some embodiments, may be dynamically determined based on the current allocation of resources of the processing system 112 across multiple active queues. The thread allocation information may also specify the number of queue entries to be fetched by a particular thread for each instance of that thread accessing the database 104, along with providing an indication of whether or not background threads are allocated and allowed to prefetch queue entries from the database 104.

In one or more embodiments, the queue processing configuration information also includes an indication of whether or not one or more fields of the queue entries will include a pointer to an auxiliary data table 140 in the database 104. For example, in some embodiments, the data for performing queued tasks may reside at a known location in the database 104, in which case the queue processing configuration information may indicate that those fields of the queue table 107 corresponding to that data will include a pointer to the location of the actual data values in an auxiliary data table 140 rather than the actual data values. Additionally, the queue processing configuration information may also identify or otherwise indicate whether custom fields or columns are to be added to the queue table 107 for the queue. Since queue performance and scale can be adversely affected by including large chunks of data on the queue, the custom fields or columns along with the auxiliary data tables 140 can be utilized to keep the queue tables 106 narrow and efficient. For example, if an API call requesting the delivery of a message to a recipient included the body of the message to be delivered, the message body could be quite large, in which case, the user defining the queue might choose to store the message body in one of the auxiliary data tables 140 rather than the queue table 107.

After the desired database type, queue type, and queue processing configuration information for the new queue to be created have been defined, the queue creation process generates or otherwise provides a notification of the new queue being created within a database of the on-demand system. In this regard, after receiving indication of the database type, queue type, queue priority, thread allocation information, and the like, the queue producer 116 generates or otherwise provides a notification to the queue manager 118 that indicates a new queue has been created for execution by the queue management server 102. The notification may also include the unique identifier associated with the queue and the priority associated with the queue, along with the identifiers corresponding to the destination database 105 and the destination table 107 for the queue. Based on the notification, the queue manager 118 allocates one or more processing threads associated with the queue consumer 120 to the newly-created queue and initiates processing of the queued task on the entries associated with newly-created queue according to the priority and thread allocation information associated with the queue, as described in greater detail herein.

Figure 2A:
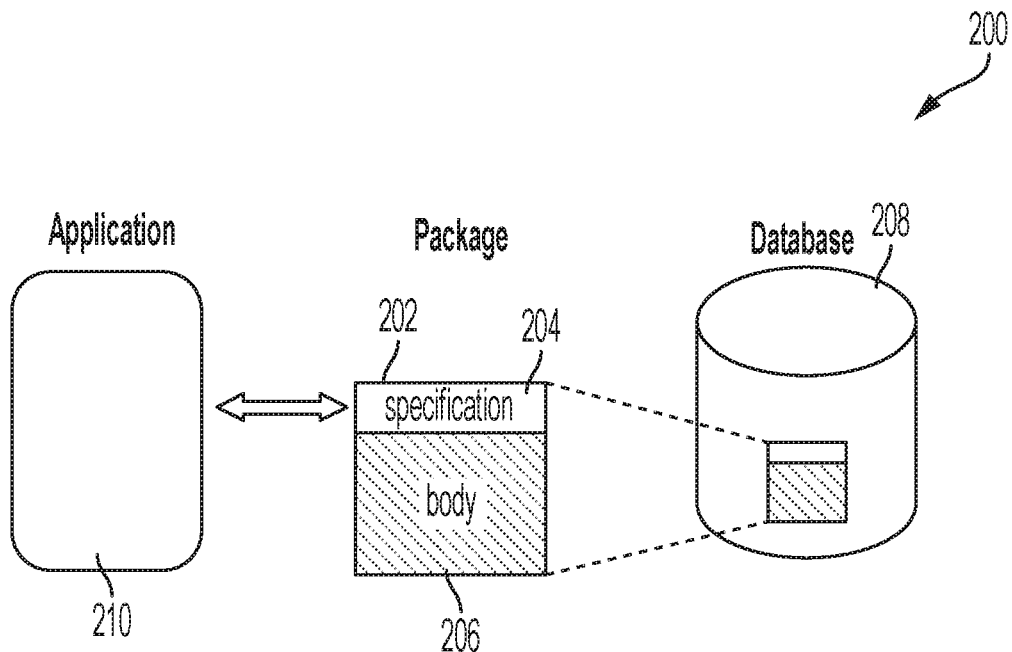
FIG. 2A shows a diagram of a package interface with an application and a database in accordance with one or more embodiments.

FIG. 2A shows a diagram of a package interface 200 with an application 210 and a database 208 in accordance with one or more embodiments. A database package or "package" 202 is defined as a schema object that groups logically related Procedural Language/Structured Query Language (PL/SQL) types, items, and subprograms. A "schema" is a named collection of database objects, including logical structures such as tables and indexes. A schema has the name of the database user who owns it. A "schema object" is a logical structure of data stored in a schema. Examples of schema objects include tables, indexes, sequences, database links, etc.

Packages 202 usually have two parts, a specification 204 and a body 206, although sometimes the body 206 is unnecessary. The specification or "spec" 202 is the interface to the applications 210. It declares the types, variables, constants, exceptions, cursors, and subprograms available for use. The body 206 fully defines cursors, subprograms, and implements the spec 204. One may think of the spec 202 as an operational interface and of the body 206 as a "black box." It is possible to debug, enhance, or replace a package body 206 without changing the package spec 204.

The spec holds public declarations, which are visible to the application. The subprograms must be declared at the end of the spec after all other items. The exceptions are pragmas that name a specific function. The pragmas must follow the function spec. In contrast, the body holds implementation details and private declarations, which are hidden from the application. The optional initialization follows the declarative part of the package body. This part typically holds statements that initialize package variables. It may also be set as to whether all the packaged subprograms execute with the privileges of their definer (this is the default) or invoker, and whether the unqualified references to schema objects are resolved in the schema of the definer or invoker.

Packages offer several advantages such as: modularity; ease of application design; information hiding; additional functionality; and improved performance. For modularity, packages let you encapsulate logically related types, items, and subprograms in a named PL/SQL module. Each package is easy to understand, and the interfaces between packages are simple, clear, and well defined. This aids application development. For application design, all that is initially needed is the interface information in the package specs. A designer may code and compile a spec without its body. Then, stored subprograms that reference the package can be compiled as well. It is not necessary to define the package bodies fully until the designer ready to complete the application.

As mentioned previously, packages can specify which types, items, and subprograms are public (visible and accessible) or private (hidden and inaccessible). For example, if a package contains four subprograms, three might be public and one private. The package hides the implementation of the private subprogram so that only the package (not the application) is affected if the implementation changes. This simplifies maintenance and enhancement. Also, by hiding implementation details from users, the integrity of the package is protected.

Packaged public variables and cursors persist for the duration of a session. So, they can be shared by all subprograms that execute in the environment. Also, they allow a user to maintain data across transactions without having to store it in the database.

When you call a packaged subprogram for the first time, the whole package is loaded into memory. So, later calls to related subprograms in the package require no disk input/output (I/O). Also, packages stop cascading dependencies and thereby avoid unnecessary recompiling. For example, if you change the implementation of a packaged function, recompiling is not needed for the calling subprograms because they do not depend on the package body.

Figure 2B:
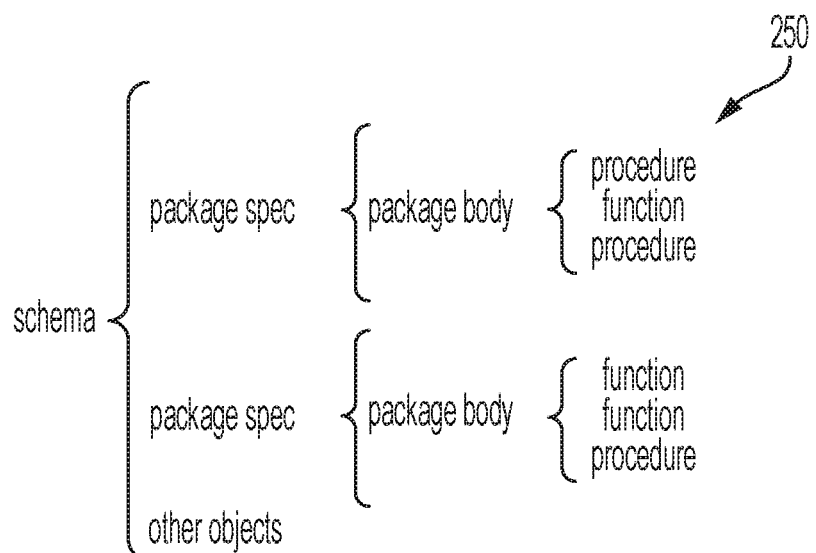
FIG. 2B shows a diagram of the package as shown in FIG. 2A.

FIG. 2B shows a detailed diagram 250 of the package 202 as shown in FIG. 2A. As previously stated, the package spec contains public declarations. The scope of these declarations is local to the database schema and global to the package. So, the declared items are accessible from the application and from anywhere in the package. The spec lists the package resources available to applications. All the information the application needs to use the resources is in the spec. Only subprograms and cursors have an underlying implementation. So, if a spec declares only types, constants, variables, exceptions, and call specs, the package body is unnecessary.

To reference the types, items, subprograms, and call specs declared within a package spec, dot notation may be used. Reference package contents may be referenced from database triggers, stored subprograms, 3GL application programs, and various other tools. Reference remote packaged variables may not be referenced directly or indirectly. For example, a user cannot call a procedure remotely because if references a packaged variable in a parameter initialization clause. Also, a user cannot reference host variables inside a package.

The package body implements the package spec. That is, the package body contains the implementation of every cursor and subprogram declared in the package spec. The subprograms defined in a package body are accessible outside the package only if their specs also appear in the package spec. To match subprogram specs and bodies, PL/SQL does a token-by-token comparison of their headers. So, except for white space, the headers must match word for word. Otherwise, PL/SQL raises an exception.

The package body can also contain private declarations which define types and items necessary for the internal workings of the package. The scope of these declarations is local to the package body. Therefore, the declared types and items are inaccessible except from within the package body. Unlike a package spec, the declarative part of a package body can contain subprogram bodies. Following the declarative part of a package body is the optional initialization section which typically holds statements that initialize some of the variables previously declared in the package. The initialization section of a package plays a minor role because, unlike subprograms, a package cannot be called or passed parameters. As a result, the initialization section of a package is run only once, the first time the package is referenced. If a package spec declares only types, constants, variables, exceptions, and call specs, the package body is unnecessary. However, the body can still be used to initialize items declared in the package spec.

In order to access a database, a connection needs to be established with the desired source database. A data source can be a DBMS, a legacy file system, or some other source of data with a corresponding driver. Typically, an application connects to a target database using one of two classes: a drivermanager which connects an application to a data source specified by a database URL; or a datasource which allows details about the underlying data source to be transparent to your application. A datasource object's properties are set so that it represents a particular data source.

Figure 3:
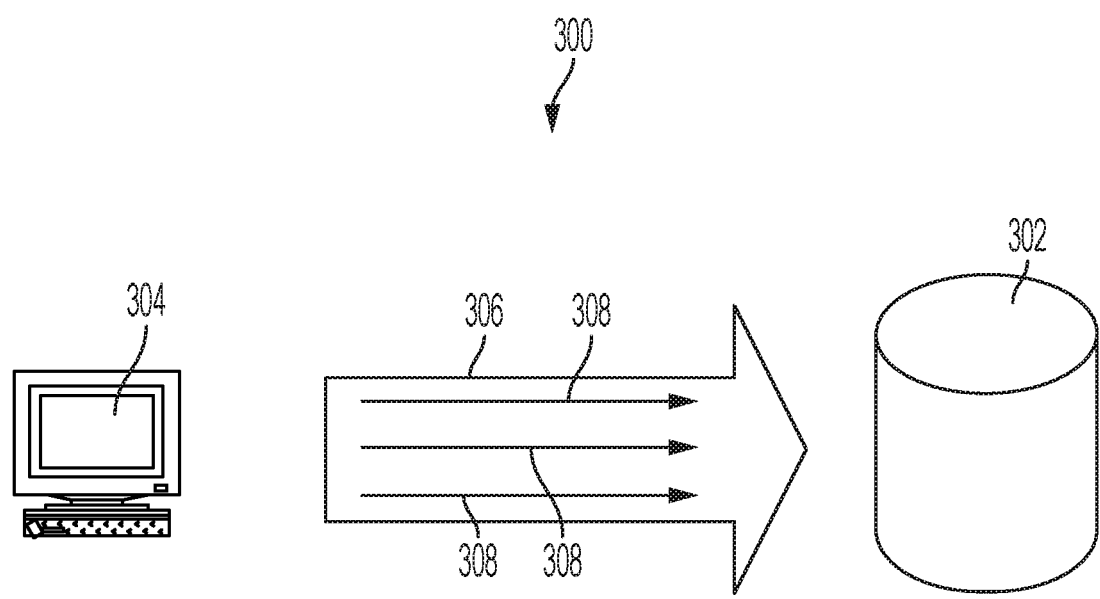
FIG. 3 shows a diagram of multiple user sessions sharing a connection to a database in accordance with one or more embodiments.

Once established, a single connection can have 0, 1, or more sessions established on it. A "session" is a logical entity in the database instance memory that represents the state of a current user login to a database. A connection and a session differ from each other in distinct ways. A "connection" is a network connection or physical pathway to the database. In contrast, a "session" encapsulates a user's interaction with the database from the time the user has been authenticated until the time the user disconnects. A session connects to a database via a physical connection. A connection may be established to a database and yet have 0, 1 or more sessions that use the given connection. In the most common instance, one session corresponds to one connection. However, multiple user sessions may share a connection to a database as shown in FIG. 3. FIG. 3 shows a diagram of multiple user sessions sharing a connection to a database in accordance with one or more embodiments. Specifically, the users 304 utilize a connection 306 that is established to the database 302. In this embodiment, 3 separate sessions 308 utilize the single connection 306. The sessions 308 may be from 1, 2 or 3 separate users.

A "connection pool" is a group of connections or sessions that controls interactions with the database from users. A "context code" is code that ties a session to a specific user request. When a database package is upgraded or updated, an application connection that has previously accessed an earlier version of the database package will see the new upgraded version for the first time. This will cause an error that results in the client connection request to fail. Is often not possible to catch the problem and retry the request because the error might have called from a "autonomous transaction" which may cause data corruption of the database. It is also possible for data corruption to happen without with non-autonomous or "manual" transactions.

When a connection request is discarded due to an error, the process of refreshing the connection request is time-consuming and costly. Such an error may cause failed requests, data corruptions, or incorrect results being returned to the request issuer such as a user, application program interface (API) or a program. A more efficient way to optimize the process involves first determining when the last update occurred to the database package and refreshing the connection request only if the timestamp of the update is greater (older) than the start of the connection session. The timestamp will identify the version of the update and when it took place.

During operations of one embodiment, the user requests a new connection from a connection pool which causes a connection context to be established which is able to execute PL/SQL code or similar database control code. If the connection request lacks the proper updates, either a flag is passed to the context code establishing a call or the names of the invalid packages are passed over to the context code. If the context code either the flags or lists the error, it will execute a dynamic retrieval of the list of change packages from a table or other structure. The list of changes is retrieved, compiled and executed. The result is the first connection call will fail due to the invalid package. As a result, the first call is ignored and the same database package and call is executed a second time. This time the call succeeds due to recompiling is been done. The connection is then established and proceeds as normal.

Figure 4:
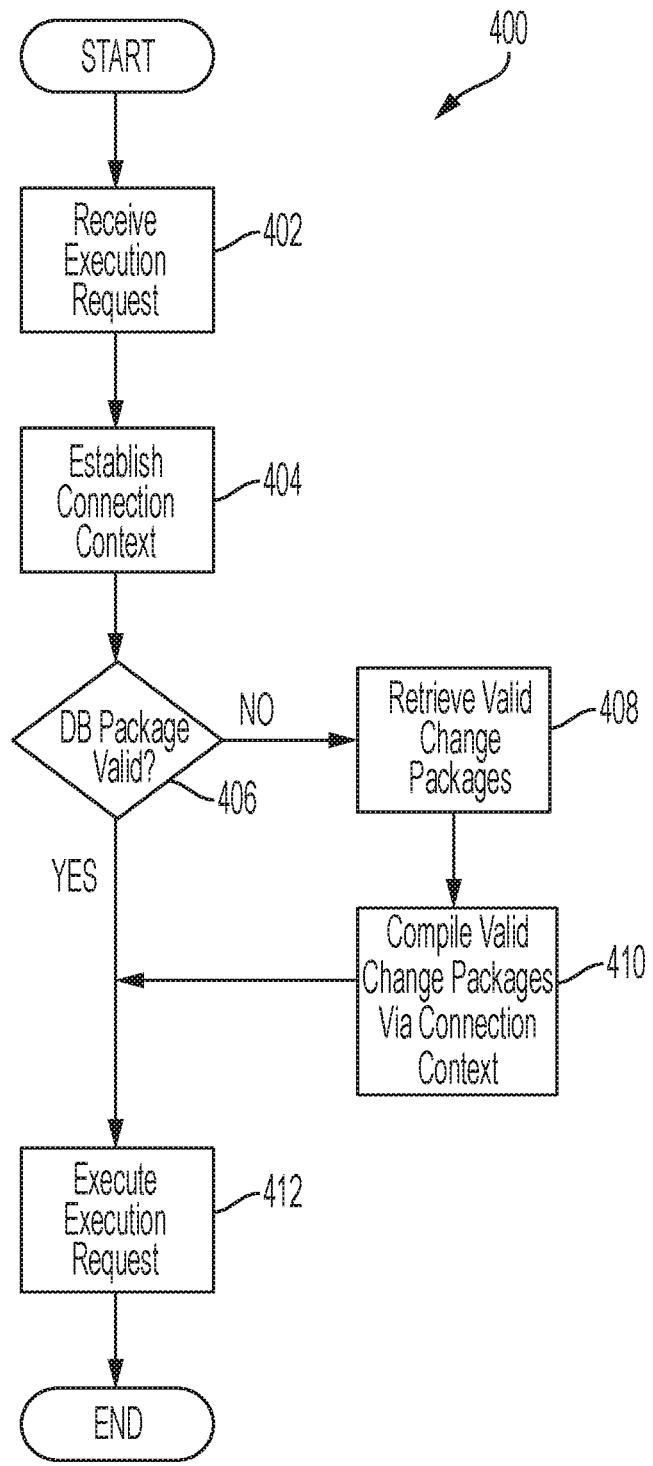
FIG. 4 is a flowchart of a method for processing database package connection requests and updates in accordance with one or more embodiments.

FIG. 4 depicts a flowchart 400 of a method for processing database package connections and updates in accordance with one or more embodiments. First, an execution request is received 402. The connection request is for a database package. In some embodiments, the connection request may be an initial connection request at the multi-tenant database. A connection context 404 is established which can execute the execution request. The database package is checked to determine if it is valid with the proper package updates prior to establishing the connection 406. Validity is based on the database package having the proper package updates. Validity is checked by determining when the last update occurred to the database package. Updates contain a timestamp that identifies the version of the update and when it took place. Additionally, if the timestamp of the update for the database package is greater (i.e., older) than the start of the connection session, the database package may be determined to not be valid.

If the database package is valid, the execution request is executed 412. However, if the database package is determined to not be valid, valid change packages are retrieved 408 and compiled for the database package 410 via the connection context. The change packages flow into the connection context either as a flag, a list of packages, or a package version identifier. Finally, the connection request is executed 412. In some embodiments, only some of the valid change packages are retrieved while in other embodiments all valid change packages are retrieved.

In some embodiments, the initial connection request may be discarded upon determining that the database package is not valid. In this case, a subsequent connection request is executed after compiling the valid change packages for the database package. The subsequent connection request may be automatically transmitted on behalf of the user to the multitenant database. In alternative embodiments, the subsequent connection request may be manually transmitted by the user. In other embodiments, a flag is set for the connection context in response to determining that the database package is not valid.

It would be advantageous to analyze the images posted across a data group to identify points of interest and detect positive usage trends across groups. Embodiments of the subject matter described herein generally relate to techniques for processing and analysis of posted online images. More particularly, embodiments of the subject matter relate to identifying positive usage trends based on analysis of posted online images. The disclosed embodiments described below may be implemented in a wide variety of different computer-based systems, architectures and platforms which may include a multi-tenant system. Additionally, the disclosed embodiments may be implemented using mobile devices, smart wearable devices, virtual systems, etc.

Figure 5:
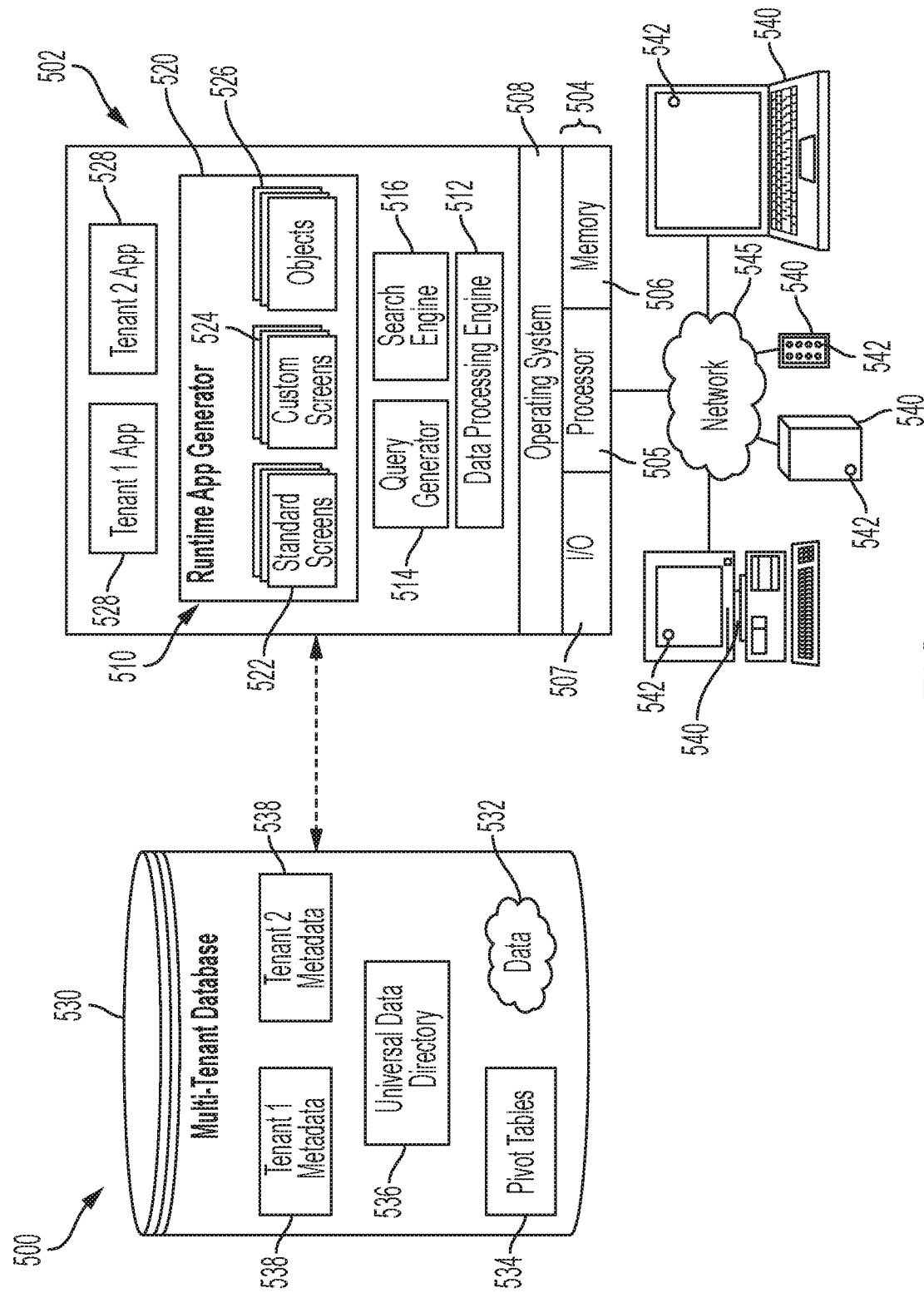
FIG. 5 is a block diagram of an exemplary multi-tenant system suitable for use in the database system of FIG. 1.

Turning now to FIG. 5, an exemplary multi-tenant system 500 includes a server 502 that dynamically creates and supports virtual applications 528 based upon data 532 from a database 530 that may be shared between multiple tenants, referred to herein as a multi-tenant database. Data and services generated by the virtual applications 528 are provided via a network 545 to any number of client devices 540, as desired. Each virtual application 528 is suitably generated at run-time (or on-demand) using a common application platform 510 that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. Stated another way, each respective user within the multi-tenant system 500 is associated with, assigned to, or otherwise belongs to a particular one of the plurality of tenants supported by the multi-tenant system 500. Tenants may represent companies, corporate departments, business or legal organizations, and/or any other entities that maintain data for particular sets of users (such as their respective customers) within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality and hardware resources without necessarily sharing any of the data 532 belonging to or otherwise associated with other tenants.

The multi-tenant database 530 may be a repository or other data storage system capable of storing and managing the data 532 associated with any number of tenants. The database 530 may be implemented using conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528, as described in greater detail below. The multi-tenant database 530 may alternatively be referred to herein as an on-demand database, in that the multi-tenant database 530 provides (or is available to provide) data at run-time to on-demand virtual applications 528 generated by the application platform 510, as described in greater detail below.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 may be implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request.

With continued reference to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530, as described in greater detail below. Typically, the user operates a conventional browser application or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired. As described in greater detail below, the query generator 514 suitably obtains the requested subsets of data 532 from the database 530 as needed to populate the tables, reports or other features of the particular virtual application 528.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

"Connected/Coupled"—The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. X depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for processing database package connections and updates for a database user, comprising:
   receiving a first execution request for executing a database control code using a specified connection, where the specified connection is between the database user and a database and is used for executing the database control code which processes the database package;
   establishing a connection context which can execute the first execution request for executing the database control code, where the connection context contains code that ties a session to the first execution request from the database user;
   determining whether the database package is valid with most recent package updates, where validity of the database package is determined prior to establishing the connection context;
   failing the first execution request for executing the database control code because the database package is determined to be invalid due lacking the most recent package updates;
   retrieving valid change packages for the database package in response to determining that the database package is not valid;
   compiling the valid change packages for the database package that creates an updated database package;
   initiating a second execution request for executing the database control code for the updated database package; and
   executing the second execution request for executing the database control code for the updated database package with the connection context after compiling the valid change packages for the database package.

2. The method of claim 1, where the first execution request for the database package is an initial connection request at a multi-tenant database.

3. The method of claim 1, where the database package is determined to be valid by referring to a timestamp for a latest package update of the database package.

4. The method of claim 3, where the timestamp contains the version of the latest package update and when the latest package update occurred.

5. The method of claim 4, where the database package is determined to not be valid if a timestamp for the latest package update is greater than start of the first execution request.

6. The method of claim 1, where a flag is set for the connection context in response to determining that the database package is not valid.

7. The method of claim 1, where all valid change packages for the database package are retrieved in response to determining that the database package is not valid.

8. An apparatus for processing database package connections and updates for a database user, comprising:
   a processor;
   a memory coupled to the processor that includes computer software program instructions capable of:
   receiving a first execution request for executing a database control code using a specified connection, where the specified connection is between the database user and a database and is used for executing the database control code for executing the database control code which processes the database package;
   request for executing the database control code, where the connection context contains code that ties a session to the first execution request from the database user;
   determining whether the database package is valid with most recent package updates, where validity of the database package is determined prior to establishing the connection context;
   failing the first execution request for executing the database control code because the database package is determined to be invalid due lacking the most recent package updates;
   retrieving valid change packages for the database package in response to determining that the database package is not valid;
   compiling the valid change packages for the database package that creates an updated database package;
   initiating a second execution request for executing a database control code for the updated database package; and
   executing the second execution request for executing a database control code for the updated database package with the connection context after compiling the valid change packages for the database package.

9. The apparatus of claim 8, where the connection request for the database package is an initial connection request at a multi-tenant database.

10. The apparatus of claim 8, where the database package is determined to be valid by referring to a timestamp for a latest package update of the database package.

11. The apparatus of claim 10, where the timestamp contains the version of the latest package update and when the latest package update occurred.

12. The apparatus of claim 11, where the database package is determined to not be valid if the timestamp for the latest package update is greater than start of the execution request.

13. The apparatus of claim 8, where a flag is set for the connection context in response to determining that the database package is not valid.

14. The apparatus of claim 8, where all valid change packages for the database package are retrieved in response to determining that the database package is not valid.

15. A computer readable storage media comprising:
computer software instructions stored in a non-transitory computer readable storage media, where the computer software instructions are configured to implement instructions capable of:
receiving a first execution request for executing a database control code using a specified connection, where the specified connection is between the database user and a database and is used for executing the database control code which processes the database package;
establishing a connection context which can execute the first execution request for executing the database control code, where the connection context contains code that ties a session to the first execution request from the database user;
determining whether the database package is valid with most recent package updates, where validity of the database package is determined prior to establishing the connection context;
failing the first execution request for executing the database control code because the database package is determined to be invalid due lacking the most recent package updates;
retrieving valid change packages for the database package in response to determining that the database package is not valid;
compiling the valid change packages for the database package that creates an updated database package;
initiating a second execution request for executing the database control code for the updated database package; and
executing the second execution request for executing the database control code for the updated database package with the connection context after compiling the valid change packages for the database package.

\* \* \* \* \*

UNITED STATES PATENT AND TRADEMARK OFFICE
CERTIFICATE OF CORRECTION

PATENT NO. : 11,182,144 B2
APPLICATION NO. : 16/236915
DATED : November 23, 2021
INVENTOR(S) : Mathur Page 1 of 1

It is certified that error appears in the above-identified patent and that said Letters Patent is hereby corrected as shown below:

In the Claims

Column 18, Line 3, Claim 1, "due lacking" should be changed to --due to lacking--;
Column 18, Line 47, Claim 8, "request for" should be changed to --requesting--;
Column 18, Line 56, Claim 8, "due lacking" should be changed to --due to lacking--;
Column 20, Line 14, Claim 15, "due lacking" should be changed to --due to lacking--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*